United States Patent [19]

Derrien

[11] Patent Number: 5,215,431
[45] Date of Patent: Jun. 1, 1993

[54] COOLED TURBINE GUIDE VANE

[75] Inventor: Mischael F. L. Derrien, Savigny Le Temple, France

[73] Assignee: Societe Nationale D'Etude et de Construction de Moteurs D'Aviation "S.N.E.C.M.A.", Paris, France

[21] Appl. No.: 904,024

[22] Filed: Jun. 25, 1992

[30] Foreign Application Priority Data

Jun. 25, 1991 [FR] France ................... 91 07765

[51] Int. Cl.⁵ ............................................. F01D 5/08
[52] U.S. Cl. ............................ 415/115; 416/97 R
[58] Field of Search ............... 415/115, 116; 416/95, 416/96 R, 97 R

[56] References Cited

U.S. PATENT DOCUMENTS

| 2,879,028 | 3/1959 | Stalker. | |
|---|---|---|---|
| 3,191,908 | 6/1965 | Powell et al. | |
| 3,574,481 | 4/1971 | Pyne et al. | 416/97 |
| 3,844,678 | 10/1974 | Sterman et al. | 415/115 |
| 4,153,386 | 5/1979 | Leogrande et al. | 415/115 |
| 4,529,357 | 7/1985 | Holland | 416/96 R |
| 5,002,460 | 3/1991 | Lee et al. | 415/115 |

FOREIGN PATENT DOCUMENTS

| 2202858 | 7/1973 | Fed. Rep. of Germany. | |
|---|---|---|---|
| 3416087 | 10/1985 | Fed. Rep. of Germany | 416/97 R |
| 2290569 | 6/1976 | France. | |
| 2460387 | 1/1981 | France. | |
| 495173 | 12/1954 | Italy | 416/97 R |
| 48702 | 3/1983 | Japan | 416/97 R |
| 205301 | 9/1986 | Japan | 416/97 R |
| 1404757 | 7/1975 | United Kingdom | 416/97 R |
| 2163218 | 2/1986 | United Kingdom. | |
| 2184492 | 6/1987 | United Kingdom. | |

Primary Examiner—John T. Kwon
Attorney, Agent, or Firm—Oblon, Spivak, McClelland, Maier & Neustadt

[57] ABSTRACT

A hollow turbine guide blade or vane is provided with three separate cooling circuits formed by virtue of two radial partitions extending the length of the blade within the cavity bounded by the outer wall of the blade and dividing the cavity into first, second and third ducts, and radial passages extending the length of the blade within the outer wall in the vicinity of the leading edge and the extrados face of the blade. The leading edge area is cooled by air flowing through the radial passages in this area and then through the first duct. The extrados face area is cooled by air flowing through the radial passages in this area and then through the second duct. The intrados face area is cooled by air flowing through the third duct. The first duct communicates with the outside of the blade through slits opening in the extrados face near the leading edge of the blade, and the second and third ducts each communicate with the outside of the blade through slits opening in the intrados face in the vicinity of the trailing edge.

10 Claims, 4 Drawing Sheets

COOLED TURBINE GUIDE VANE

BACKGROUND OF THE INVENTION

1. Field of the invention

The present invention relates to a turbine guide blade or vane of the type which is swept internally by cooling air, the outer wall of the blade bounding an interior space and having an aerodynamic outer profile defining the leading edge of the said blade, its extrados face, its trailing edge, and its intrados face.

2. Summary of the prior art

Industrial and commercial competition causes aircraft engine manufacturers to seek constantly to improve the performance of turboshaft engines. Such improvement may be obtained by raising the temperature of the gases at the inlet of the turbine. The part most affected by these high temperature levels is the first stage of the fixed guide blades, and several solutions have already been proposed for the cooling of these guide blades.

Published French Patent Application No. 2 290 569 proposes placing an insert inside the internal space of the blade, the outer wall of the blade having on its inner face axial projections communicating in the vicinity of the leading edge with the inner cavity of the insert. In this construction, the leading edge is cooled by the impact of the air issuing from the inner cavity of the insert. However, difficulties may be encountered in equalizing the volumes of cooling air emitted between the root of the blade and the head of the blade, and equalizing the temperatures in the blade section.

U.S. Pat. No. 4,153,386 discloses a guide blade in which the internal space of the blade is divided into two ducts and has inserts provided with holes for the escape of air towards the outer wall. In this construction, the air is evacuated along the inlet ducts and flows axially near the outer wall of the blade to cool said wall.

U.S. Pat. Nos. 3,574,481 and 2,879,028 describe blades in which an internal duct is supplied with air, and the air escapes along this duct through openings and flows axially in the vicinity of the outer wall of the blade.

Published GB Patent Application No. 2 184 492 discloses a movable blade having a plurality of radial passages communicating with small diameter ducts connected to the outside of the blade by a plurality of holes. Here also, the air escapes progressively from the root of the blade.

In all the blades described above, the volume of cooling air decreases progressively from one end of the blade.

Published French Patent Application No. 2 460 387 discloses a hollow blade in which cooling ducts are provided in the outer wall of the blade, the blade wall being provided with extra thickness in the vicinity of the hotter areas. This document does not mention the possibility of a cooling air curtain along the outer surfaces of the blade, and the blade cannot therefore be a guide blade mounted at the head of a turbine.

SUMMARY OF THE INVENTION

It is an object of the present invention to provide a turbine guide blade or vane having an internal cooling arrangement which gives good resistance to very high temperatures, and equalization of temperatures throughout the section of the blade.

To this end, according to the invention there is provided a turbine guide blade of the type which is swept internally by cooling air, comprising:

a head end;

a root end;

an outer wall extending between said head and root ends and bounding an interior space, said outer wall having an aerodynamic profile providing said blade with a leading edge, an extrados face, a trailing edge, and an intrados face;

a first fluid-tight partition in said interior space disposed substantially parallel to a plane bisecting said trailing edge on the intrados face side of said plane;

a second fluid-tight partition in said interior space connecting said intrados face to said first partition;

said first and second partitions extending the length of said blade between said head and root ends and dividing said interior space of said blade into a first duct adjacent said leading edge, a second duct adjacent said extrados face, and a third duct adjacent said intrados face;

means defining first radial passages extending the length of said blade in said outer wall in the vicinity of said leading edge, said first radial passages, in use, being supplied with air through one of said ends of said blade and communicating with said first duct at the other of said blade ends;

means defining second radial passages extending the length of said blade in said outer wall adjacent said second duct, said second radial passages, in use, being supplied with air through one of said ends of said blade and communicating with said second duct at the other of said blade ends;

means defining first slits through said outer wall in said extrados face near said leading edge, said first slits communicating said first duct with the outside of said blade;

means defining second slits through said outer wall in said intrados face in the immediate vicinity of said trailing edge, said second slits communicating said second duct with the outside of said blade; and means defining third slits through said outer wall in said intrados face in the vicinity of said trailing edge;

said third duct, in use, being supplied with air through one of said ends of said blade and communicating with the outside of said blade through said third slits.

By means of this construction the cooling means of the blade are divided into three distinct circuits: a cooling circuit for the leading edge, a cooling circuit for the extrados face, and a cooling circuit for the intrados face. Moreover, the cooling air for the leading edge flows without loss in the radial passages of the leading edge before entering the first duct from which it escapes to form a protective film of air on the extrados face. Similarly, the cooling air for the extrados face flows without loss in the radial passages provided in the outer wall on the extrados face side of the blade before entering the second duct from which it escapes in the trailing edge area. It must be noted also that in each of these two cooling circuits the air flows in a given direction in the first part of its path, and in the opposite direction in the last part of its path.

This arrangement permits an intensive cooling of the outer wall of the blade, particularly in the areas most exposed to high temperatures.

The construction of the blade is also facilitated by the fact that all the passages are radial.

Preferably at least one of the said first radial passages is provided with radially arranged cooling fins.

Preferably, the second radial passages each have an oblong cross-section, and the greater dimension of the said section is substantially parallel to the extrados face of the blade.

Advantageously, the first slits are staggered throughout the length of the blade.

Other features and advantages of the invention will become apparent from the following description of the preferred embodiments, given by way of example, with reference to the attached drawings.

DESCRIPTION OF THE PREFERRED EMBODIMENTS

Figure 1:
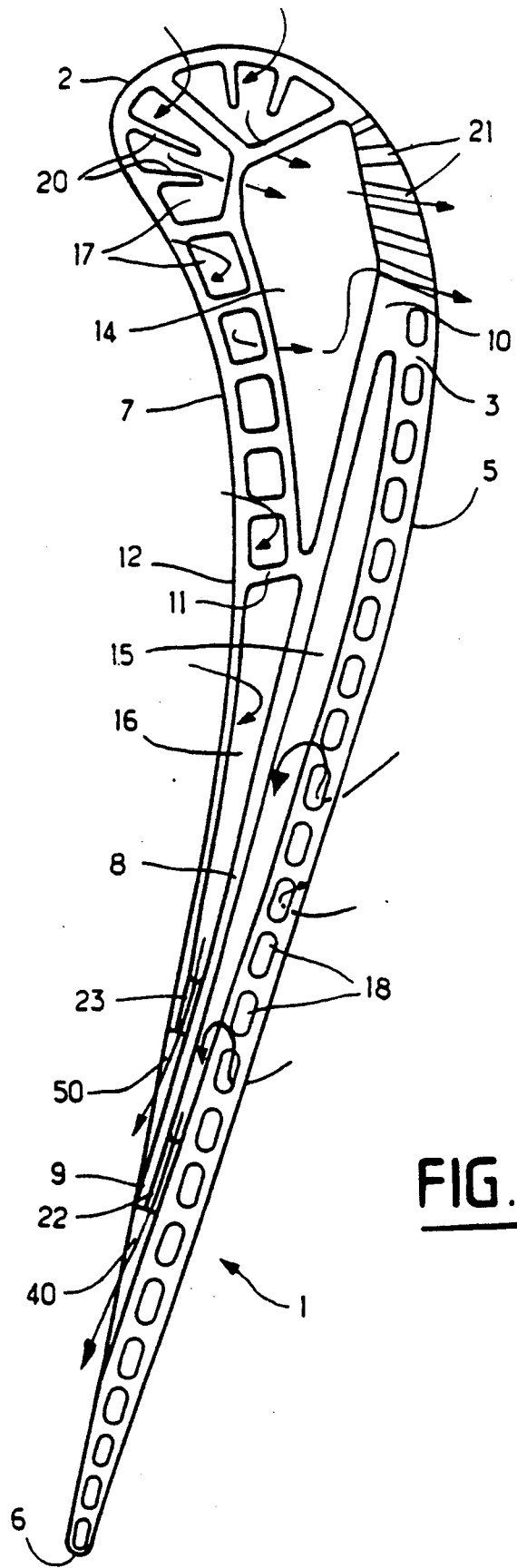
FIG. 1 shows a cross-section through a first embodiment of a blade in accordance with the invention.

The guide blade 1 of the present invention forms part of an assembly of fixed blades evenly distributed in the annular space through which the hot gases generated in the combustion chamber of a turbojet engine escape. This assembly of fixed blades is mounted upstream of an assembly of movable blades of a high pressure turbine, and its purpose is to deflect the jet of hot gases issuing axially at speed from the combustion chamber and striking the leading edge 2 of each of the fixed blades.

Each fixed blade 1 is connected at its head end to the outer casing of the turbojet engine, and at its root end to an inner casing. Platforms defining the annular space of the hot gas flow path are provided between successive fixed blades in the vicinity of the heads and roots of the blades.

Each fixed blade 1 is hollow and has an outer wall 3 defining an interior space. The outer wall 3 has, in cross-section, an aerodynamic profile defining the leading edge 2 of the blade 1, its extrados face 5, its trailing edge 6 and its intrados face 7.

The interior space of the blade 1 is divided into three mutually fluid-tight portions by means of two partitions 8 and 11 which extend throughout the length of the blade. The first partition 8 lies in a plane substantially parallel to a plane bisecting the trailing edge 6 of the blade and on the side of this bisecting plane towards the intrados face 7. The partition 8 thus connects an area 9 of the intrados face 7 in the vicinity of the trailing edge 6 to an area 10 of the extrados face 5 near the leading edge 2. The second partition 11 is of small width and connects the first partition 8 to an area 12 of the intrados face 7 situated substantially mid-way between the area 9 and the leading edge 2.

The internal space defined by the outer wall 3 is thus divided into a first duct 14 of substantially trapezoidal cross-section situated adjacent the leading edge 2, a second duct 15 of oblong cross-section extending over the greater part of the extrados face 5 adjacent the trailing edge 6, and a third duct 16 of triangular section extending along the part of the intrados face 7 situated adjacent the trailing edge 6.

The outer wall 3 is extra thick along the first and second ducts. In these extra thicknesses radial passages are provided which extend throughout the length of the blade 1. The blade 1 thus has first radial passages 17 in the outer wall 3 adjacent the first duct 14, these passages 17 being in the vicinity of the leading edge 2 and the intrados face 7. In addition, the blade has second radial passages 18 throughout the length of the wall 3 defining the extrados face 5 adjacent the second duct 15. These second radial passages 18 have a cross-section of oblong shape, the greater dimension of which is substantially parallel to the extrados face 5.

The first radial passages 17 have a cross-section larger than that of the second passages 18 and of a polygonal shape. Preferably, some of these first radial passages 17 have cooling fins 20 which extend from the outer wall 3 throughout the length of the blade 1.

As will be seen from the drawings, the first duct 14 communicates with the outside of the blade by first slits 21 extending through the wall 3 in the extrados face 5 close to the leading edge 2, the slits 21 being arranged in a staggered formation along the length of the blade 1.

The second duct 15 also communicates with the outside of the blade, by means of second slits 22 through the wall 3 in the intrados face 7 adjacent the trailing edge 6, and the third duct 16 communicates with the outside through third slits 23 provided in the intrados face 7 in the vicinity of the area 9.

The directions of the cooling air flow in the radial passages 17,18 and in the ducts 14,15,16 are shown by arrows in the drawings.

Thus, it will be seen that the first radial passages 17 are supplied with cooling air at the blade head, and after having flowed along these passages 17, the cooling air enters the first duct 14 at the blade root before being emitted on the extrados face 5 through the first slits 21.

In contrast, the second radial passages 18 are supplied with cooling air at the blade root, this cooling air being directed into the second duct 15 at the blade head before being emitted at the trailing edge 6 through the second slits 22.

The third duct 16 is constantly supplied with cooling air at the blade head, this cooling air being emitted through the third slits 23 in the intrados face 7 in the general vicinity of the trailing edge 6.

As will be appreciated, the cooling air of the leading edge 2 flows without loss in the first part of its travel, i.e. in the first radial passages 17, then in the opposite direction in the second part of its travel, i.e. in the first duct 14. Similarly, the cooling air in the cooling circuit for the extrados face 5 flows without loss in the first part of its travel, i.e. in the second radial passages 18, then in the reverse direction in the second part of its travel, i.e. in the second duct 15.

The outer wall 3 is thus swept by a constant quantity of fresh air throughout the length of the blade 1 close to the leading edge 2 and to the extrados face 5. Moreover, the cooling air flows from the head of the blade to the root in the first radial passages 17, and in the opposite direction in the second radial passages 18.

Alternatively, the cooling air may flow in the same direction in the first radial passages 17 and the second radial passages 18. Furthermore, the first radial passages 17 and the third duct 16 may be supplied with the cooling air at the blade root, and the second radial passages 18 may be supplied at the blade head.

In order to improve the heat exchange efficiency, the radial passages 17 and 18, as well as the ducts 14,15 and 16, may be provided with mini-flow-disturbing means (not shown) on their inner walls.

Figure 2:
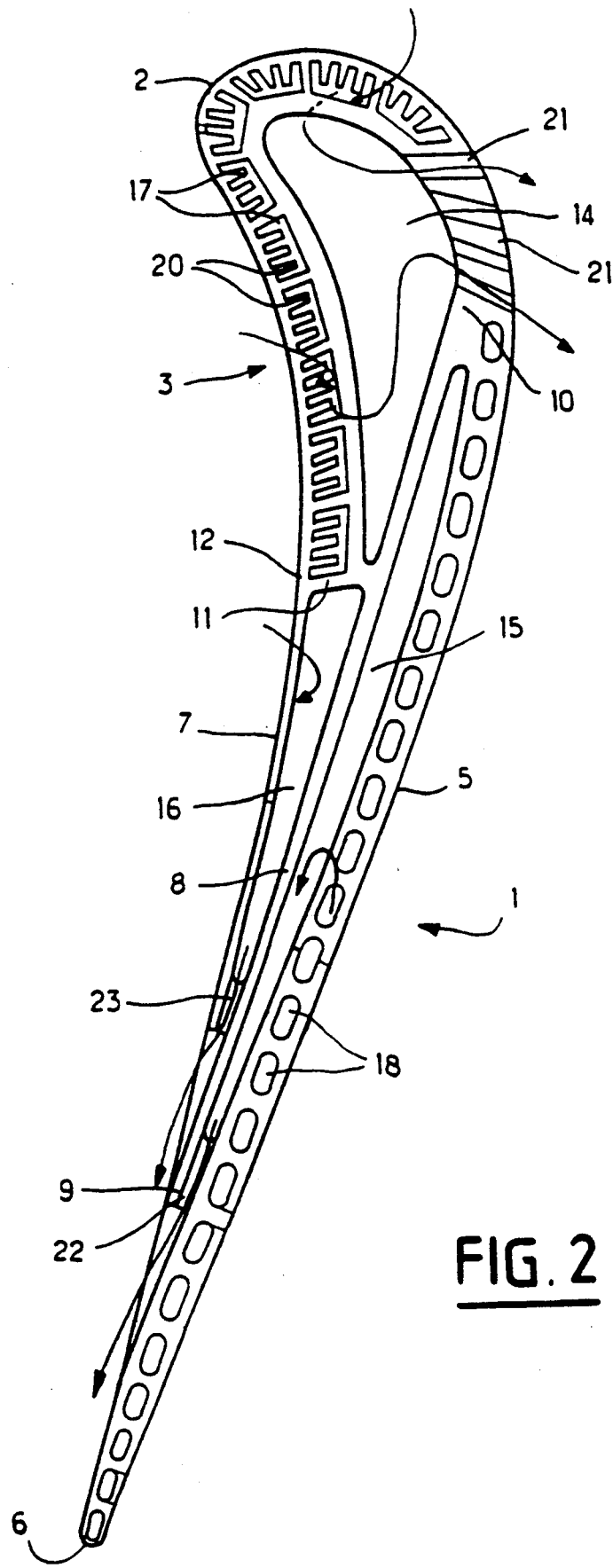
FIG. 2 shows a cross-section through a second embodiment of a blade in accordance with the invention.
Figure 3:
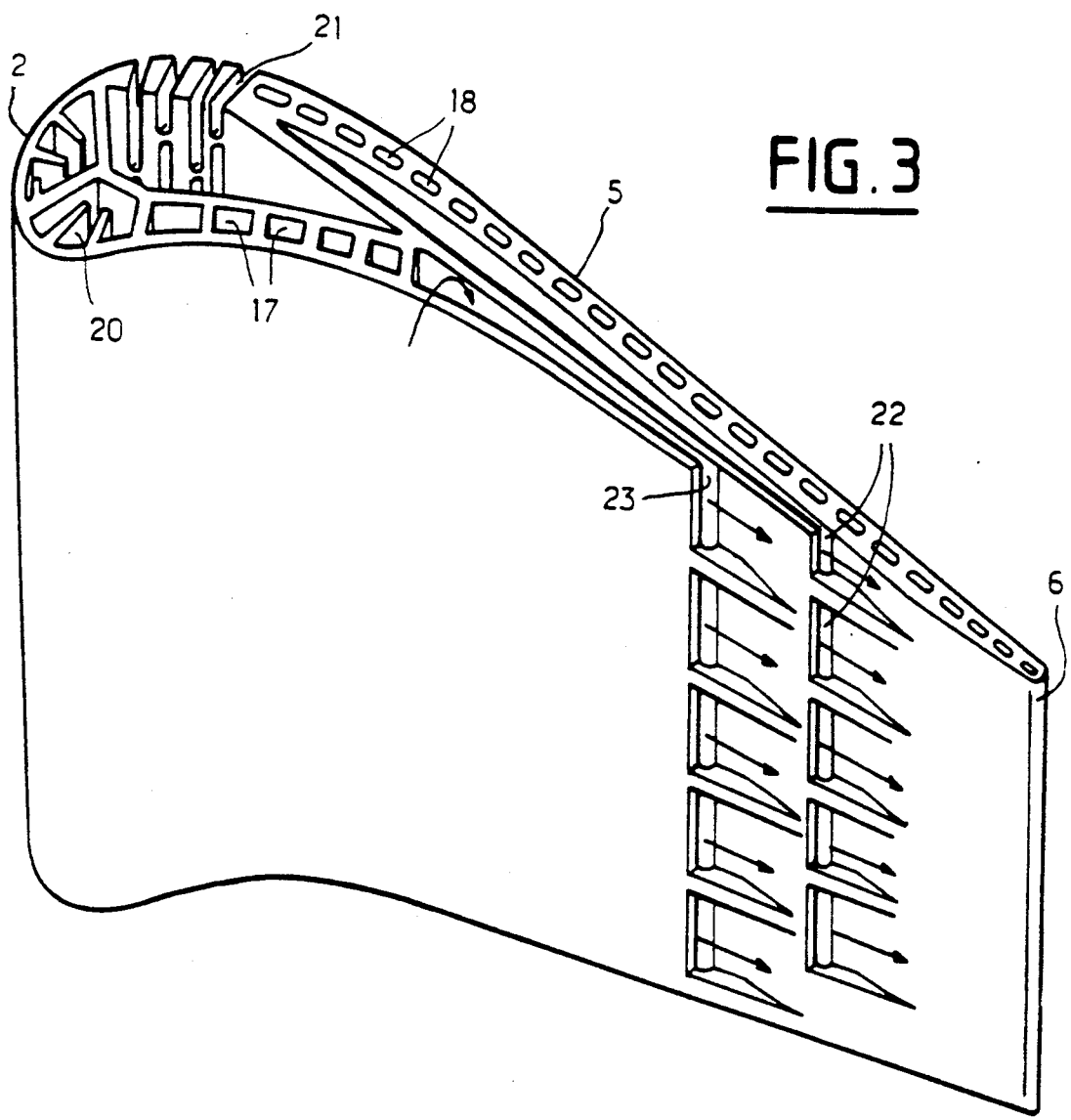
FIG. 3 is a perspective view of a portion of the blade shown in FIG. 1.
Figure 3A:
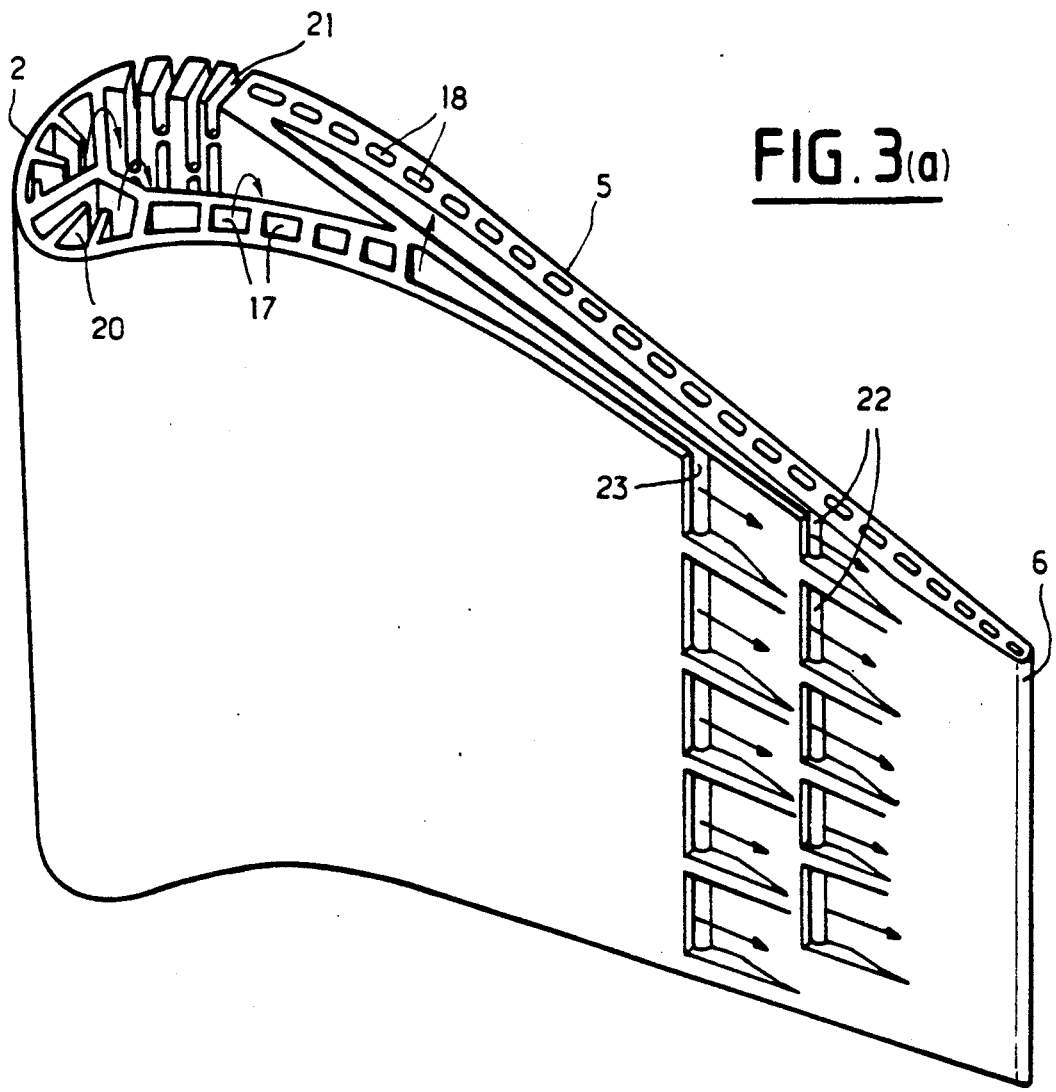
FIG. 3(a) is a perspective view of a portion of the blade shown in FIG. 1 with a different flow direction.
Figure 4:
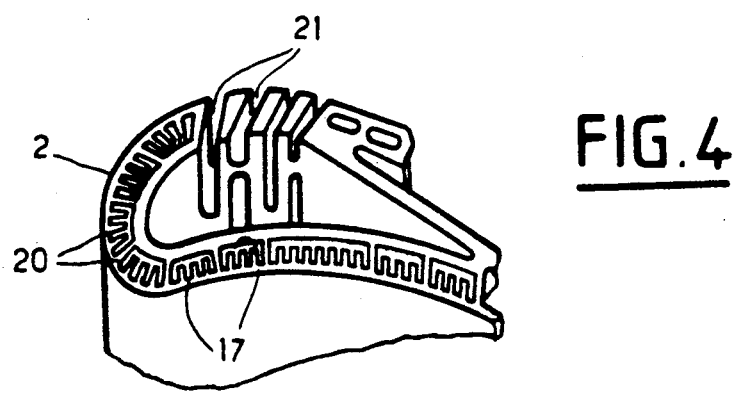
FIG. 4 is a perspective view of the leading edge region of the blade shown in FIG. 2.

As may be seen from the first embodiment shown in FIGS. 1 and 3, the first radial passages 17 situated in the immediate vicinity of the leading edge 2 have cooling fins 20. In the second embodiment shown in FIGS. 2 and 4, all of the first passages 17 have comb-like radial fins 20.

The blade 1 in accordance with the present invention may withstand gas temperatures of 2500° K. with a cooling air temperature at 880° K., while taking less air from the compressor than existing blade designs. It should be noted that the cooling air may be re-used to cool the blade platforms.

I claim:

1. A turbine guide blade or vane of the type which is swept internally by cooling air, comprising:
   a head end;
   a root end;
   an outer wall extending between said head and root ends and bounding an interior space, said outer wall having an aerodynamic profile providing said blade with a leading edge, an extrados face, a trailing edge, and an intrados face;
   a first fluid-tight partition in said interior space disposed substantially parallel to a plane bisecting said trailing edge on the intrados face side of said plane;
   a second fluid-tight partition in said interior space connecting said intrados face to said first partition;
   said first and second partitions extending the length of said blade between said head and root ends and dividing said interior space of said blade into a first duct adjacent said leading edge, a second duct adjacent said extrados face, and a third duct adjacent said intrados face;
   means defining first radial passages extending the length of said blade in said outer wall in the vicinity of said leading edge, said first radial passages, in use, being supplied with air through one of said ends of said blade and communicating with said first duct at the other of said blade ends;
   means defining second radial passages extending the length of said blade in said outer wall adjacent said second duct, said second radial passages, in use, being supplied with air through one of said ends of said blade and communicating with said second duct at the other of said blade ends;
   means defining first slits through said outer wall in said extrados face near said leading edge, said first slits communicating said first duct with the outside of said blade;
   means defining second slits through said outer wall in said intrados face in the immediate vicinity of said trailing edge, said second slits communicating said second duct with the outside of said blade; and
   means defining third slits through said outer wall in said intrados face in the vicinity of said trailing edge;
   said third duct, in use, being supplied with air through one of said ends of said blade and communicating with the outside of said blade through said third slits.

2. A turbine guide blade according to claim 1, wherein radially disposed cooling fins are provided in at least one of said first radial passages.

3. A turbine guide blade according to claim 1, wherein said second radial passages each have an oblong cross-section, and the greater dimension of said oblong cross-section is substantially parallel to said extrados face of said blade.

4. A turbine guide blade according to claim 1, wherein the direction of flow of said cooling air in said first radial passages is opposite that in said second radial passages.

5. A turbine guide blade according to claim 1, wherein the direction of flow of said cooling air in said first radial passages is the same as in said second radial passages.

6. A turbine guide blade according to claim 1, wherein said first radial passages are supplied with said cooling air at said head end of said blade.

7. A turbine guide blade according to claim 1, wherein said first radial passages are supplied with said cooling air at said root end of said blade.

8. A turbine guide blade according to claim 1, wherein said third duct is supplied with said cooling air through said head end of said blade.

9. A turbine guide blade according to claim 1, wherein said third duct is supplied with said cooling air through said root end of said blade.

10. A turbine guide blade according to claim 1, wherein said first slits are disposed in a staggered arrangement throughout the length of said blade.

* * * * *